(12) United States Patent
Patil

(10) Patent No.: US 10,154,398 B2
(45) Date of Patent: Dec. 11, 2018

(54) METHODS AND SYSTEMS FOR NODE SELECTION IN MULTIHOP WIRELESS SENSOR NETWORKS

(71) Applicant: Wipro Limited, Bangalore (IN)

(72) Inventor: Shraddha Sangram Patil, Pune (IN)

(73) Assignee: Wipro Limited, Bangalore (IN)

(*) Notice: Subject to any disclaimer, the term of this patent is extended or adjusted under 35 U.S.C. 154(b) by 98 days.

(21) Appl. No.: 15/380,395

(22) Filed: Dec. 15, 2016

(65) Prior Publication Data

US 2018/0124547 A1 May 3, 2018

(30) Foreign Application Priority Data

Nov. 2, 2016 (IN) .............................. 201641037482

(51) Int. Cl.
*H04W 4/70* (2018.01)
*H04L 12/751* (2013.01)
(Continued)

(52) U.S. Cl.
CPC ............... *H04W 4/70* (2018.02); *H04L 45/02* (2013.01); *H04W 40/10* (2013.01); *H04W 40/14* (2013.01); *H04L 63/00* (2013.01)

(58) Field of Classification Search
CPC ......... H04W 4/70; H04W 4/00; H04W 40/14; H04W 40/12; H04W 40/02; H04W 40/10; H04W 40/04; H04L 45/02; H04L 63/00
(Continued)

(56) References Cited

U.S. PATENT DOCUMENTS 9,467,925 B1* 10/2016 Baroudi ................ H04W 40/10
2007/0291689 A1* 12/2007 Kapur ................... H04W 40/26
370/328
(Continued)

FOREIGN PATENT DOCUMENTS

| CN | 102572991 A | 7/2012 |
| CN | 103237333 A | 8/2013 |
| CN | 104038965 A | 9/2014 |

OTHER PUBLICATIONS

Shinde & Kale, "A Survey on Admission Control and Trust Based Opportunistics Routing in Wireless Ad Hoc Networks," International Journal of Engineering Research & Technology (IJERT) ISSN: 2278-0181 3 (12):70-74 (2014) (www.ijert.org).
(Continued)

*Primary Examiner* — Kwang B Yao
*Assistant Examiner* — Syed M Bokhari
(74) *Attorney, Agent, or Firm* — LeClairRyan PLLC

(57) ABSTRACT

A method and system for node selection in a multihop wireless sensor network is disclosed. The method includes: determining, at a source node, a leftover energy associated with each neighboring node of the source node and determining a secure value associated with each neighboring node of the source node. A potential candidate set is generated, which includes one or more nodes for which leftover energy is greater than an energy threshold. Thereafter, an actual candidate set is generated from the potential candidate, such that, secure value of each node in the actual candidate set is greater than a secure value threshold. Further, the actual candidate set is sorted based on a priority value determined based on the secure value. Finally, a node with the highest priority value in the actual candidate set is selected for receiving a data packet from the source node.

14 Claims, 10 Drawing Sheets

(51) Int. Cl.
*H04W 40/10* (2009.01)
*H04W 40/14* (2009.01)
*H04L 29/06* (2006.01)

(58) Field of Classification Search
USPC .......................................................... 370/328
See application file for complete search history.

(56) References Cited

U.S. PATENT DOCUMENTS

2016/0212698 A1* 7/2016 Guo .................. H04W 52/0203
2017/0150417 A1* 5/2017 Baroudi ................ H04W 40/08

OTHER PUBLICATIONS

Subramaniam et al., "Trust Based Routing to Improve Network Lifetime of Mobile Ad Hoc Networks," J. Computing Information Tech. 21(3):149-160 (2013).

* cited by examiner

METHODS AND SYSTEMS FOR NODE SELECTION IN MULTIHOP WIRELESS SENSOR NETWORKS

This application claims the benefit of Indian Patent Application Serial No. 201641037482 filed Nov. 2, 2016 which is hereby incorporated by reference in its entirety.

FIELD

The present invention relates to node selection in multihop wireless sensor network, in particular, to methods and systems for a trust and eligibility based energy efficient node selection in multihop wireless sensor network.

BACKGROUND

Recent advances in wireless and network technologies have enabled a wide range of applications for wireless sensor networks that include target tracking, environment monitoring, industrial monitoring, health care monitoring and traffic surveillance. Traditionally, sensors (also referred to as relay or node) with limited computation power, gathered and transmitted information about an environment to a centralized repository. The transmission of information to a centralized repository from remote nodes typically involves enormous power consumption when the transmission happens over a wireless communication channel. However, over a period of time, nodes with additional computational capabilities were designed and the nodes were configured to transmit the gathered information to the centralized repository in the wireless sensor network by means of one or more hops.

Further, routing protocols were designed for transferring data in multihop wireless sensor network, wherein a shortest energy path between a source node and a sink node with optimal energy consumption was determined. However, such routing protocols often lead to uneven energy distribution in the multihop wireless sensor network. Moreover, nodes are usually battery-powered, and a potential node may often need to enter a sleep cycle to conserve energy. Consequently, a considerable overhead is required to be exchanged between the source node and the neighboring nodes in the multihop wireless sensor network. Furthermore, unreliable wireless links and network partition cause packet loss and require multiple retransmissions for a preselected sensible path.

Thus, there is a need for an efficient method for selecting a node for data transmission in a multihop wireless sensor network based on energy consumption and security of the node.

SUMMARY

In one embodiment, a method for node selection in a multihop wireless sensor network comprising a plurality of nodes is disclosed. The method includes determining, at a source node, a leftover energy associated with each neighboring node of the source node; determining, at the source node, a secure value associated with each neighboring node of the source node; generating, at the source node, a potential candidate set comprising at least one node of the neighboring nodes associated with the source node, wherein leftover energy of each of the at least one node is greater than an energy threshold; generating, at the source node, an actual candidate set, wherein the actual candidate set comprises nodes from the potential candidate set whose secure value is greater than a secure value threshold; sorting, at the source node, the actual candidate set based on a priority value, wherein the priority value is determined based on the secure value; and selecting, at the source node, a node with the highest priority value in the actual candidate set for transmission of a data packet from the source node.

In another embodiment a system for transmitting data packets in a multihop wireless sensor network comprising a plurality of nodes is disclosed. The system includes a database, and a processor, wherein the processor is operatively coupled to the database. The processor is configured to determine a leftover energy associated with each neighboring node of a source node; determine a secure value associated with each neighboring node of the source node; generate a potential candidate set comprising at least one node of the neighboring nodes associated with the source node, wherein leftover energy of each of the at least one node is greater than an energy threshold; generate at the source node, an actual candidate set, wherein the actual candidate set comprises nodes from the potential candidate set whose secure value is greater than a secure value threshold; sort the actual candidate set based on a priority value, wherein the priority value is determined based on the secure value; and select a node with the highest priority value in the actual candidate set for transmission of a data packet from the source node.

In yet another embodiment, a computer-usable medium is disclosed, the computer-usable medium having non-transitory computer readable instructions stored thereon for execution by a processor in a multihop wireless sensor network comprising a plurality of nodes to perform a method for determining a leftover energy associated with each neighboring node of a source node; determining a secure value associated with each neighboring node of the source node; generating a potential candidate set comprising at least one node of the neighboring nodes associated with the source node, wherein leftover energy of each of the at least one node is greater than an energy threshold; generating an actual candidate set, wherein the actual candidate set comprises nodes from the potential candidate set whose secure value is greater than a secure value threshold; sorting the actual candidate set based on a priority value, wherein the priority value is determined based on the secure value; and selecting a node with the highest priority value in the actual candidate set for transmission of a data packet from the source node.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments of the invention provide methods, systems, and computer program products for node selection in a multihop wireless sensor network comprising a plurality of nodes. The method includes determining, at a source node, a leftover energy associated with each neighboring node of the source node. Thereafter, the method determines a secure value associated with each node of the source node. After determining the leftover energy and the secure value, the method generates a potential candidate set that includes one or more nodes of the neighboring nodes associated with the source node, such that, leftover energy of each of the one or more nodes is greater than an energy threshold. Thereafter, the method generates an actual candidate set, wherein the actual candidate set includes nodes from the potential candidate set whose secure value is greater than a secure value threshold. After generating the actual candidate set, the method sorts the actual candidate set based on a priority value. The priority value is determined based on the secure value. Finally, the method selects a node with the highest priority value in the actual candidate set for transmission of a data packet from the source node.

Figure 1:
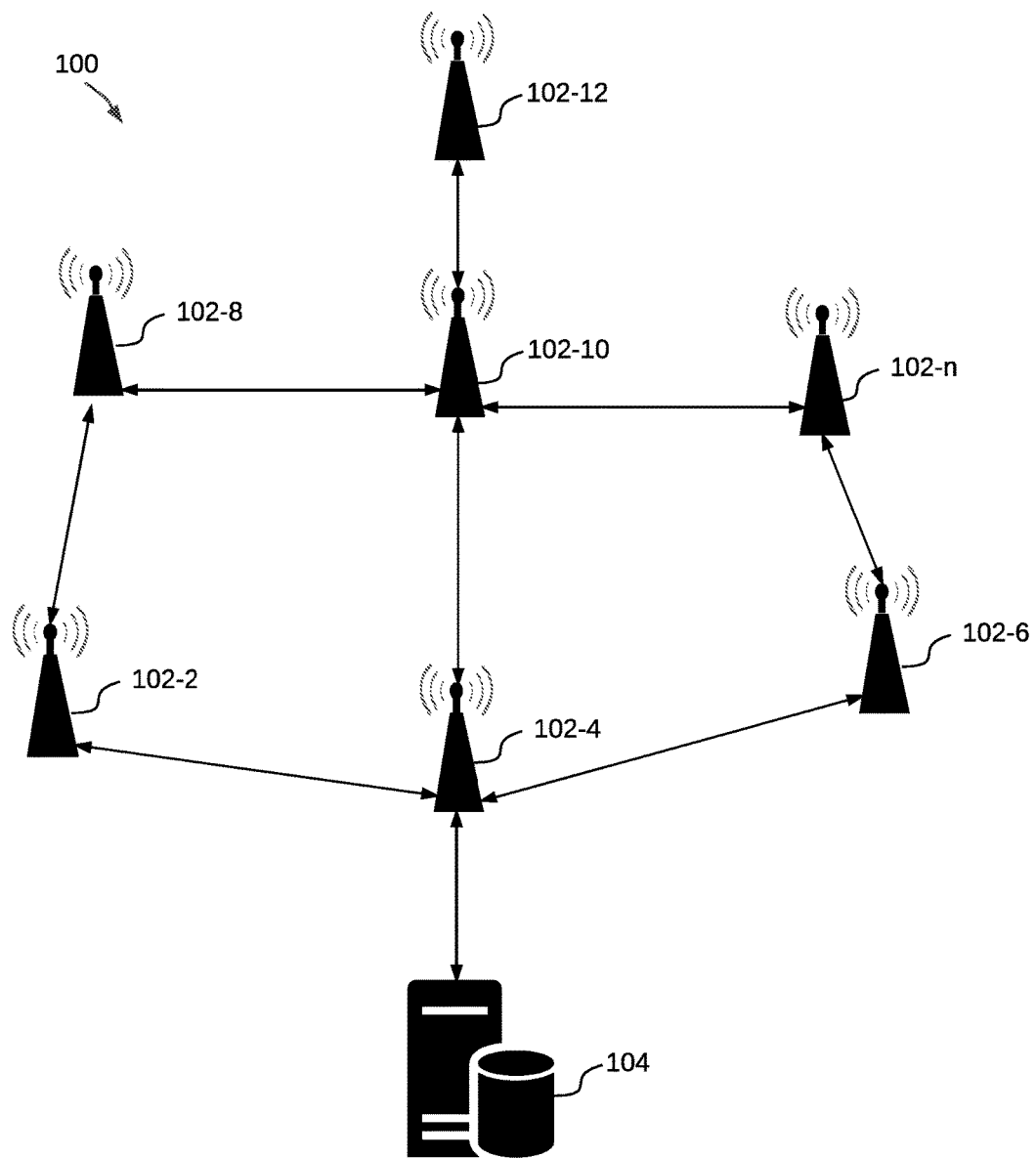
FIG. 1 is a system diagram of a multihop wireless sensor network (that is exemplary) in which embodiments of the present inventive concepts may be employed.

FIG. 1 is a system diagram of a multihop wireless sensor network 100 in which embodiments of the present inventive concepts may be employed. Multihop wireless sensor network 100 includes a plurality of sensor nodes 102-n, and a network database 104. Each sensor node 102-2, 102-4, 102-6 . . . , 102-n (n is the total number of sensor nodes in multihop wireless sensor network 100) senses certain parameters, such as temperature, pressure, humidity, stress, vibration, and transmits the sensed data to network database 104. Multihop wireless sensor network 100 may be utilized for a wide range of applications such as target tracking, environment monitoring, industrial monitoring, health care monitoring, and traffic surveillance. As shown in FIG. 1, the arrows interconnecting pair of sensor nodes illustrate that the only interconnected sensor nodes can communicate with one another. For example, sensor node 102-2 can send data packets to and receive data packets from sensor node 102-4 and sensor node 102-8. In the same manner, sensor node 102-4 can send data packets to and receive data packets from sensor node 102-2, sensor node 102-6, and sensor node 102-10.

Thus, the sensed data within multihop wireless sensor network 100 may be transmitted from a source node to a destination node or to network database 104 directly or indirectly using wireless or radio communication. The source node may use one or more other sensor nodes to reach the destination node or network database 104 when network coverage of the source node is not able to directly reach the destination node or network database 104. This type of communication where source node utilizes other nodes in multihop wireless sensor network 100 to reach the destination node is commonly known as multihop routing.

Figure 2:
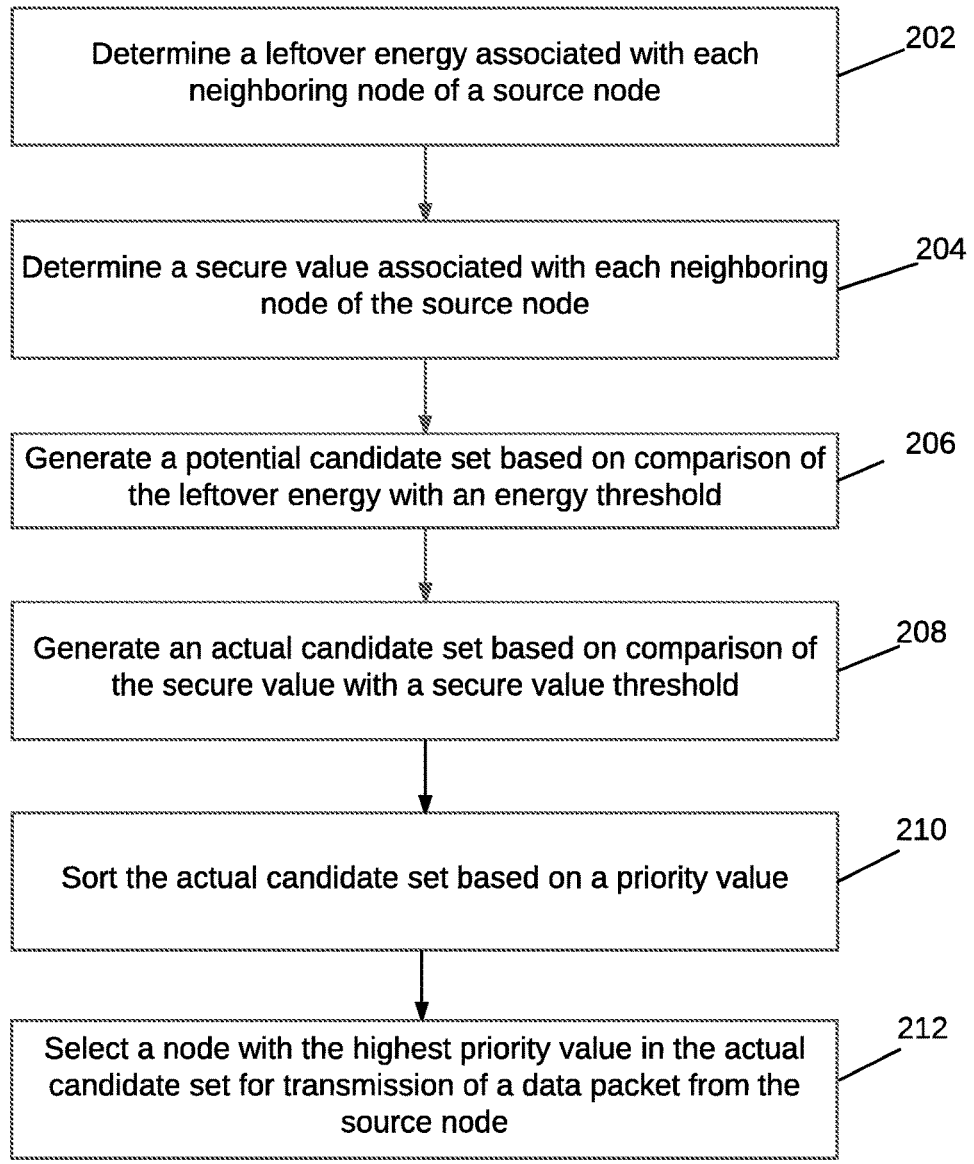
FIG. 2 illustrates a flowchart of a method for node selection in a multihop wireless sensor network comprising a plurality of nodes, in accordance with an embodiment.

FIG. 2 illustrates a flowchart of a method for node selection in a multihop wireless sensor network 100 comprising a plurality of nodes, in accordance with an embodiment. As explained in conjunction with FIG. 1, data may be sent from a node to another node either directly or indirectly using one or more hops. Thus, when data needs to be transferred from a source node to a destination node within multihop wireless sensor network 100, one or more intermediate nodes within multihop wireless sensor network 100 may be utilized. In order to determine a node for receiving a data packet from the source node, energy efficiency as well as eligibility of the node needs to be considered and evaluated before forwarding the data packet.

Thus, at step 202, a leftover energy associated with each neighboring node of the source node is determined at the source node. Alternatively, each neighboring node of the source node may determine its own leftover energy and share the information with the source node. The leftover energy is determined by calculating difference between a total amount of energy consumed by a node ($E_{max}$) to amount of energy consumed by the node to receive all incoming data packets plus amount of energy consumed by the node to send all outgoing data packets. In an embodiment, every node in multihop wireless sensor network 100 calculates the leftover energy of each of its neighboring node. In an embodiment, the leftover energy may be calculated using a Leftover Energy Eligibility Based selection scheme (LEEB).

In the LEEB selection scheme, a cluster head which has the highest leftover energy and requires a minimum distance for communication is selected from the plurality of nodes present in multihop wireless sensor network 100. Typically, intra topology communication cost is a function of network properties. Network properties may correspond to topology size, and whether or not variable power levels are permissible for intra-system communication. If the energy level used for network topology communication is fixed for all nodes, then the cost can be proportional to either (a) The requirement to distribute energy among heads, or (b) 1/node degree, if the requirement is to create dense network.

After selecting the cluster head, average of the minimum energy (AME) levels required by all nodes within the network range to reach the cluster head is determined. In an embodiment, the AME levels may be determined as shown in equation (1). In equation (1), min (Pi) denotes the minimum energy level required by a node 1<i<M, where M is the number of nodes within the topology.

$$AME = \frac{\sum_{i=1}^{M} \min(Pi)}{M} \quad (1)$$

Further, the leftover energy in every node in the network is determined as shown in equation (2), wherein ELeftover is the estimated current leftover energy in a node.

$$ELeftover = Emax - AME \quad (2)$$

Thereafter, at step 204, a secure value associated with each neighboring node of the source node is determined. The secure value represents the reliability of a node for receiving and forwarding a data packet. The secure value also represents the eligibility and trust factor of a node. Thus, a node with high secure value would indicate that the node would reliably receive the data packet and forward the data packet to the next hop. In an embodiment, the secure value of each node is periodically updated. This is further explained in detail in conjunction with FIG. 4. In another embodiment, the secure value of each node is updated whenever topology of multihop wireless sensor network 100 changes or is modified. This is further explained in detail in conjunction with FIG. 5. The secure value is utilized to identify malicious nodes within multihop wireless sensor network 100 and thereby avoid repeated transmission of a data packet and ensure the overall security.

In an embodiment, every node may calculate the secure value of its neighboring node using equation (3), wherein $DR_f$ is a forward delivery ratio, $DR_r$ is a reverse delivery ratio and ETC is expected count for transmission.

$$ETC = 1/(DR_f \times 1/DR_r) \quad (3)$$

The ETC metric incorporates the effects of link loss ratios, asymmetry in the loss ratios between the two directions of each link, and interference among the successive links of the path. ETC improves the throughput of multi-hop routes by up to a factor of two over a minimum hop-count metric. ETC provides the most improvement for paths with two or more hops in multihop wireless sensor network 100. Further, ETC offers increased benefit as networks grow larger and paths become longer. The ETC of a link is the predicted number of data transmissions required to send a packet over the link, including retransmissions. The ETC of a route is the addition of the ETC for each link in the route. For example, the ETC of a three-hop route with perfect links is three; the ETC of a one-hop route with a 50% delivery ratio is two.

As shown in equation (3), the ETC of a link is calculated using the forward and reverse delivery ratios of the link. The forward delivery ratio (DRf) is the measured probability that a data packet successfully arrives at the recipient, and the reverse delivery ratio (DRr) is the probability that the ACK packet is successfully received. The expected probability that a transmission is successfully received and acknowledged is $DR_f \times DR_r$. Thus, a sender will retransmit a packet that is not successfully acknowledged.

After determining the secure value, at step 206, a potential candidate set is generated. The potential candidate set is generated based on comparison of the leftover energy associated with each neighboring node of the source node with an energy threshold. Thus, the potential candidate set includes one or more nodes of the neighboring nodes associated with the source node. When the leftover energy is greater than the energy threshold, it is ensured that the nodes have sufficient energy to forward a data packet. This is further explained in detail in conjunction with FIG. 6. Thereafter, at step 208, an actual candidate set is generated based on a comparison of secure value with a secure value threshold. The secure value is determined as a factor of those nodes whose leftover energy is greater than the energy threshold. Thus, the actual candidate set includes one or more nodes from the potential candidate set whose leftover energy is greater than the energy threshold and secure value is greater than the secure value threshold. If it is determined that a node has a secure value lower than the secure value threshold, then the node is discarded and not included in the actual candidate set.

At step 210, the actual candidate set is sorted based on a priority value. The priority value for each node in the actual candidate set is determined based on the corresponding secure value associated with each node. The secure value is determined based on the ETC matrix as explained in equation (3). Thus, the nodes in the actual candidate set are sorted in descending order of the secure value. For instance, the nodes are prioritized in decreasing order of their corresponding ETC in order to provide the assurance that each node has higher secure value and less number of retransmission.

After sorting the actual candidate set based on the priority value, at step 212, a node with the highest priority value in the actual candidate set is selected. The node with the highest priority value is selected for transmission of a data packet from the source node. Thus, address of the node with the highest priority value is added to the data packet in order to facilitate the transmission of the data packet. An example of forwarding a data packet from the source node to the destination node, wherein the data packet is forwarded through node with the highest priority value is further explained in detail in conjunction with FIG. 9.

Figure 3:
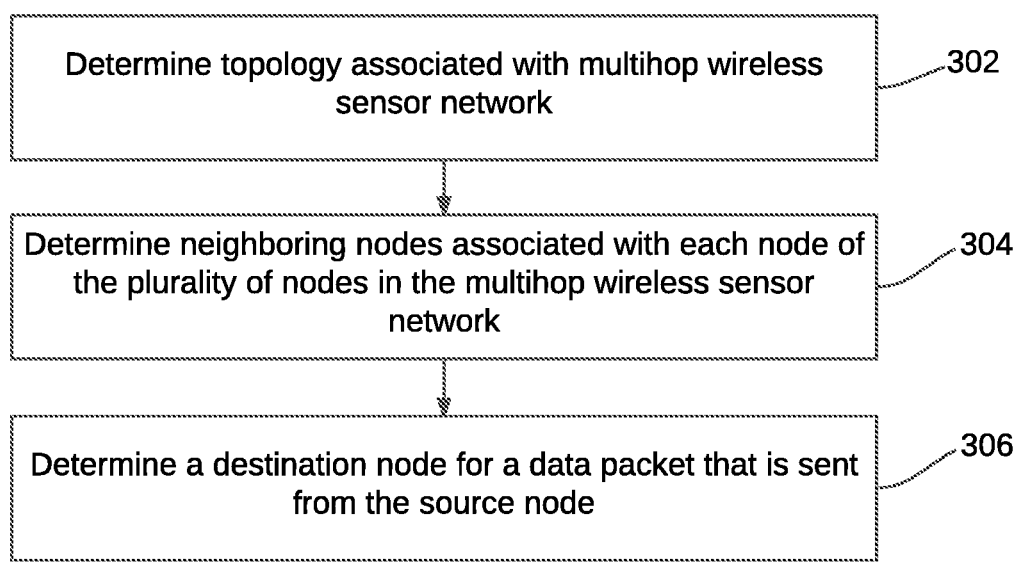
FIG. 3 illustrates a flowchart of a method for determining one or more parameters associated with multihop wireless sensor network, in accordance with an embodiment.

FIG. 3 illustrates a flowchart of a method for determining one or more parameters associated with multihop wireless sensor network 100, in accordance with an embodiment. In order for data packet transmission in multihop wireless sensor network 100, one or more parameters associated with multihop wireless sensor network 100 and data packet needs to be determined. Thus, at step 302, topology information associated with multihop wireless sensor network 100 is determined. The topology information is used to identify size, shape, quantity, and position of nodes and links in multihop wireless sensor network 100. The topology information also provides data about the source node and location of the source node in multihop wireless sensor network 100. Thereafter, at step 304, neighboring nodes associated with each node of the plurality of nodes present in multihop wireless sensor network 100 is determined. Finally, at step 306, a destination node is determined to which a data packet from a source node needs to be transferred. Based on the determination of the destination node, neighboring nodes, and the topology information associated with multihop wireless sensor network 100, the data packet transfer is initiated.

Figure 4:
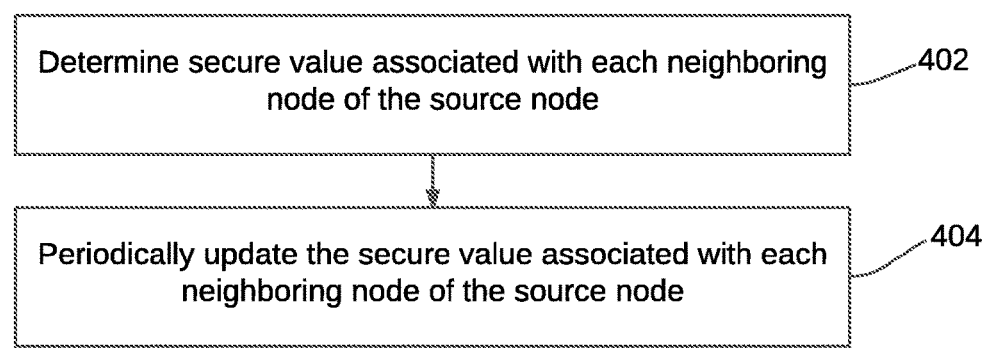
FIG. 4 illustrates a flowchart of a method for periodically updating secure value associated with each node, in accordance with an embodiment.

FIG. 4 illustrates a flowchart of a method for periodically updating secure value associated with each node, in accordance with an embodiment. Initially, the leftover energy associated with each neighboring node of the source node is determined for initiating transfer of a data packet from the source node to the destination node. This has already been explained in detail in conjunction with FIG. 2. An important parameter to be considered while initiating the transfer of the data packer is secure value associated with each node. Thus, at step 402, a secure value associated with each neighboring node of the source is determined. The secure value is calculated based on a forward delivery ratio, and a reverse delivery ratio. The forward delivery ratio corresponds to a probability that a data packet successfully arrives at a receiving node from a sending node, and the reverse delivery ratio corresponds to a probability that an Acknowledgment (ACK) packet is successfully received at the sending node. This has already been explained in conjunction with equation (3).

After determining the secure value, at step 404, the secure value associated with each neighboring node of the source node is periodically updated. The secure value may be updated in response to one or more conditions getting fulfilled. Examples of such one or more conditions include, but are not limited to modification in topology of multihop wireless sensor network 100, predetermined cycle time, addition or removal of a neighboring node of the source node, presence or determination of a malicious activity, completion of a hop of a data packet, and changes in software associated with multihop wireless sensor network 100. The secure value is periodically updated to identify any malicious nodes in multihop wireless sensor network 100. Further, the secure value also helps in ensuring that repeated retransmission of data packet is avoided.

Figure 5:
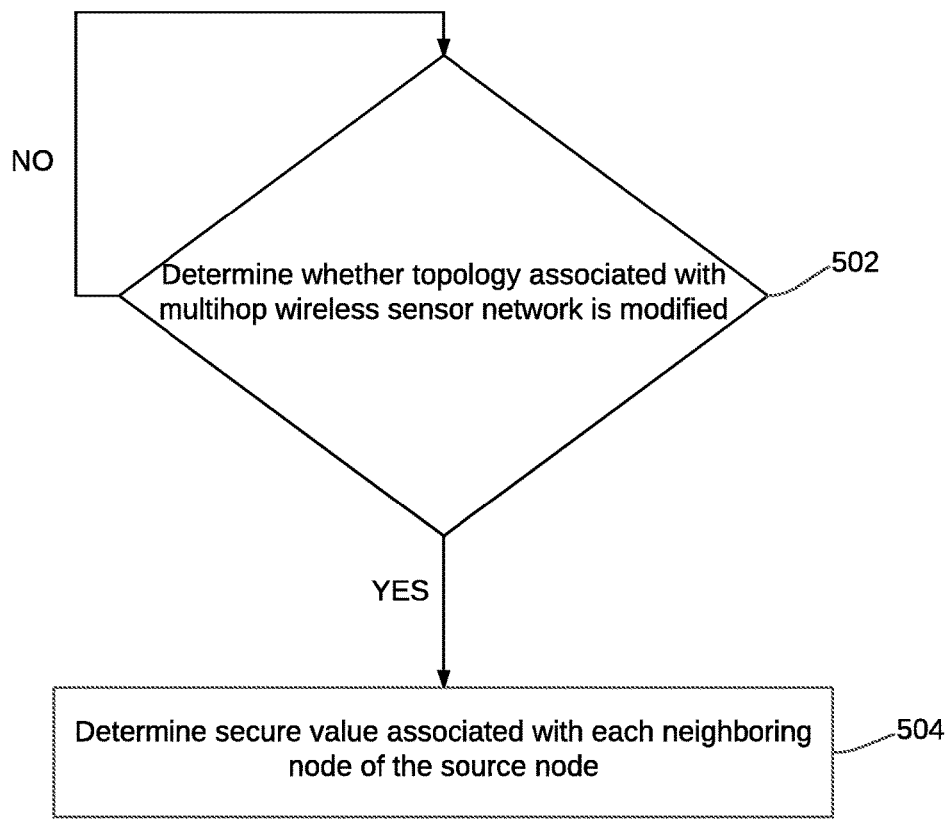
FIG. 5 illustrates a flowchart of a method for periodically updating secure value associated with each node, in accordance with an embodiment.

FIG. 5 illustrates a flowchart of a method for periodically updating secure value associated with each node, in accordance with an embodiment. At step 502, it is determined whether the topology associated with multihop wireless sensor network 100 is modified. The topology may be modified because of various reasons such as addition or removal of nodes within multihop wireless sensor network 100, and isolation of specific nodes from multihop wireless sensor network 100 due to malicious activities. If it is determined that the topology is modified, then at step 504, the secure value associated with each neighboring node of the source node is updated. If the topology is not modified, then the secure value associated with each neighboring node of the source node is not updated.

Figure 6:
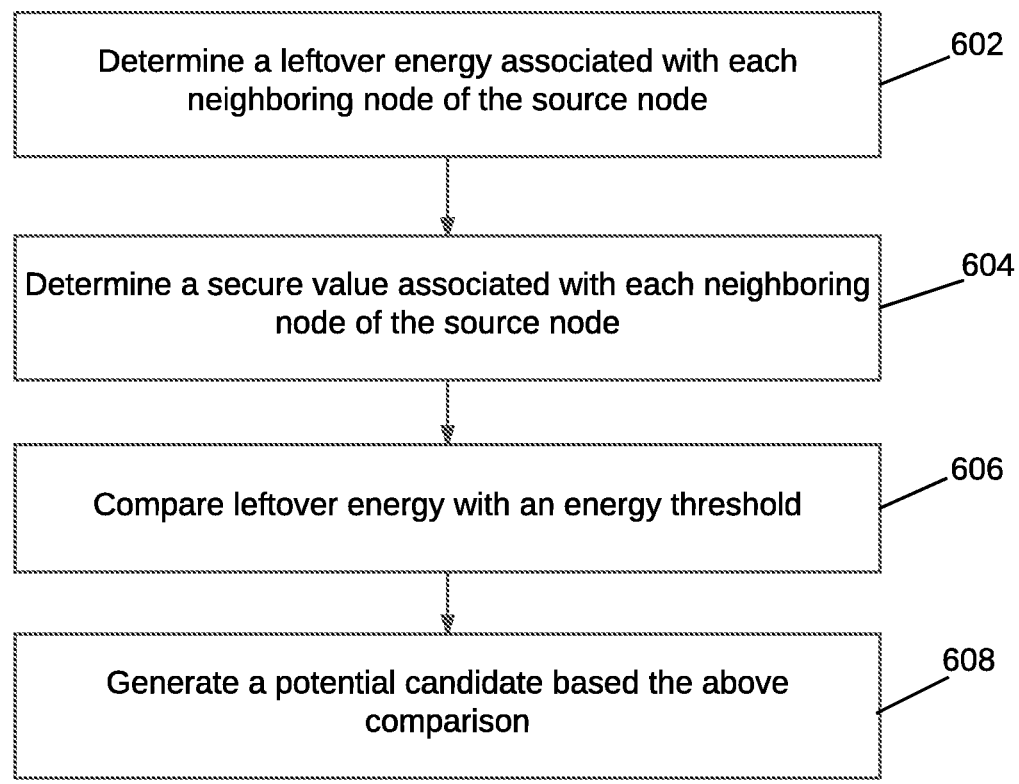
FIG. 6 illustrates a flowchart of a method for generating a potential candidate set, in accordance with an embodiment.

FIG. 6 illustrates a flowchart of a method for generating a potential candidate set, in accordance with an embodiment. In order to transfer a data packet from the source node to the destination node, initially, at step 602, a leftover energy associated with each neighboring node of the source node is determined. Thereafter, at step 604, a secure value associated with each neighboring node of the source node is determined. This has already been explained in conjunction with FIG. 2. After determining the leftover energy and the secure value, at step 606, for each neighboring node, the leftover energy is compared with an energy threshold. Thereafter, at step 608, a potential candidate set is generated that includes nodes which have leftover energy greater than the energy threshold. After generating the potential candidate set, a node is selected for receiving the data packet from the source node based on a priority value. This is further explained in detail in conjunction with FIG. 7.

Figure 7:
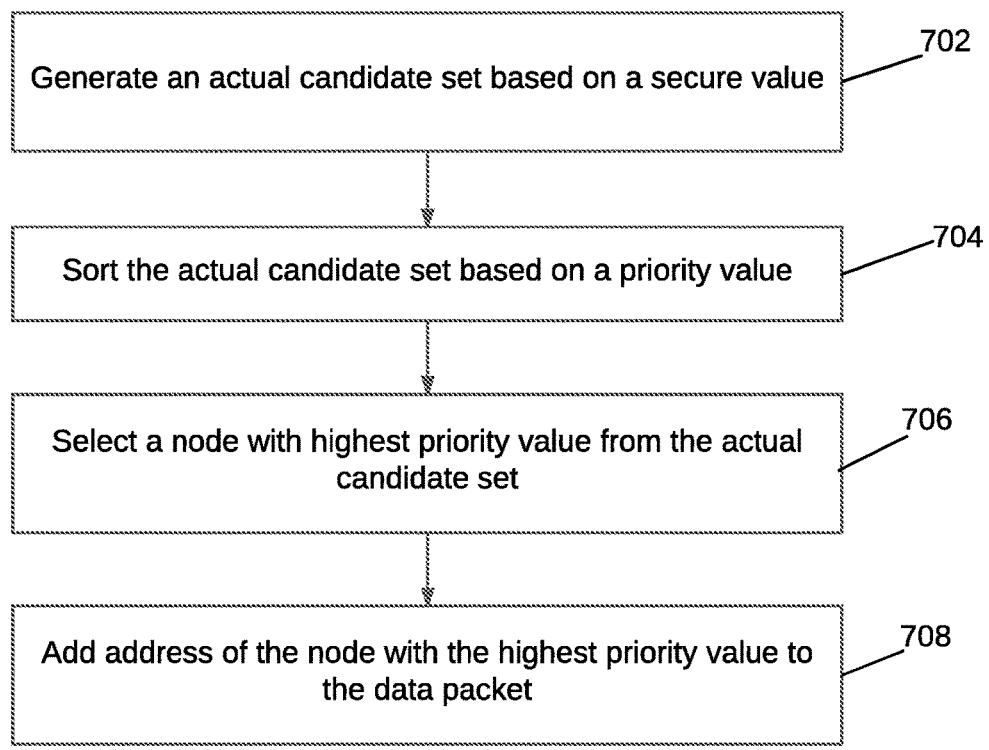
FIG. 7 illustrates a flowchart of a method for adding address of a node with high priority value to a data packet, in accordance with an embodiment.

FIG. 7 illustrates a flowchart of a method for adding address of a node with high priority value to a data packet, in accordance with an embodiment. In order to facilitate transfer of a data packet from source node to the destination node, a potential candidate set is generated. The potential candidate set includes those nodes from the neighboring nodes associated with the source node, for which the leftover energy is greater than the energy threshold. Thereafter, at step 702, an actual candidate set is generated based on a secure value, such that secure value of nodes in the candidate set is greater than a secure value threshold. The secure value is determined as a factor of those nodes whose leftover energy is greater than the energy threshold. Thus, the actual candidate set includes a subset of the one or more nodes whose leftover energy is greater than the energy threshold. After generating the actual candidate set, at step 704, the one or more nodes in the actual candidate sets are sorted based on a priority value. The priority value is generated for each node present in the actual candidate set. The priority value is determined based on the ETC matrix. The nodes present in the actual candidate set are sorted in a descending order of their corresponding ETC in order to provide the assurance that each node has a higher secure value and less number of retransmission.

In order to select a node with a higher secure value and a less ETC, ETC is calculated using equation (3). Thus, a node with a high priority value is not only a secure node, but also a node located at a closer distance to the destination node. Hence, the priority of ordering among the nodes in the actual candidate set is in a decreasing order. This has already been explained in detail in conjunction with FIG. 2. At step 706, a node that has the highest priority value is selected from the actual candidate set. Finally, at step 708, address of the node with the highest priority value is added to the data packet. As a result, the data packet is forwarded from the source node to the node whose address has been added in the data packet as part of the next hop.

Figure 8:
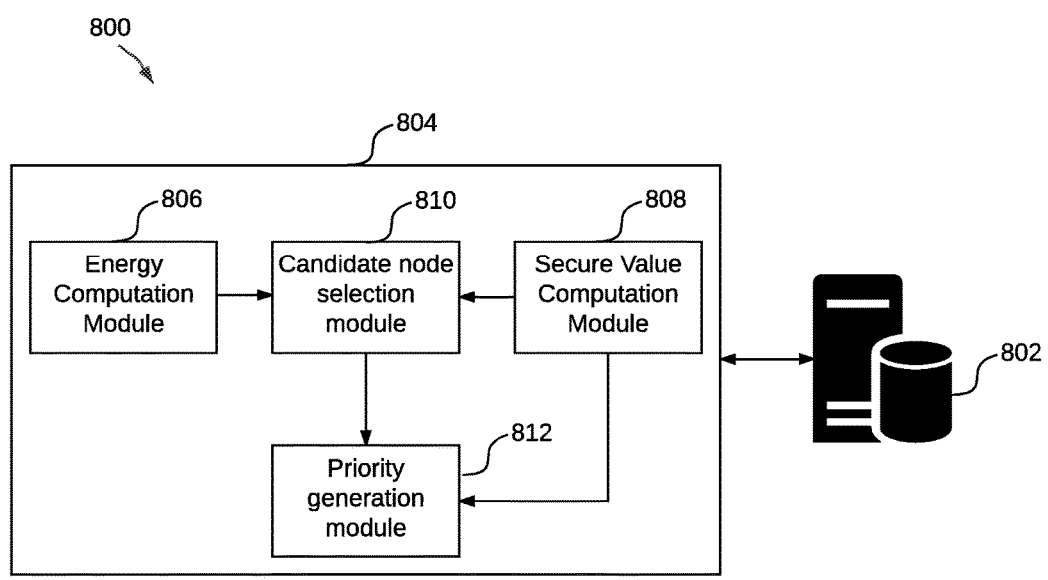
FIG. 8 illustrates a system for transmitting data packets in a multihop wireless sensor network comprising a plurality of nodes, in accordance with an embodiment.

An ETSB_OR algorithm may be utilized to select the node from the actual candidate set. The node selected based on the ETSB_OR algorithm has high trust based secure value as well as high energy efficiency. The ESTB_OR algorithm provides ways as to how to select and prioritize the actual candidate set based on the leftover energy on each node and the secure value of each candidate node. The ETSB_OR algorithm also helps in determining the optimal node in the actual candidate set that respond in a priority order. Thus, the ETSB_OR algorithm uses the leftover energy, optimal energy, the secure value parameter and the priority value to select the node from the actual candidate set for the next hop. The pseudo code for ESTB_OR algorithm is as follows:

Send Receive (P)
Begin
If (P Destination == My ID)
Receive Packet (P)
Else
// Neighbor Node Selection //
NB[ ] = Get_Neighbor( );
GetEnergy (NB);
GetEligibility (NB);
// Generate potential candidate set //
$W_{x,d}^i = \phi$
For each node k ∈ NB
    If k ≠ x & $E_{Leftover}(k) > E_{Threshold}$
    If k ≠ x & ETC (k) > $E_{Threshold}$
then,
    $W_{x,d}^i = W_{x,d}^i \cup \{k\}$
End if
End if
End for
// Generate actual candidate set $C_{x,d}^i$ from $W_{x,d}^i$ //
$C_{x,d}^i = \phi$
While no new candidate is added to $C_{x,d}^i$
For each candidate in $W_{x,d}^i$ do
If k ∈ $W_{x,d}^i$ and $T_k > T_{Threshold}$ then
$C_{x,d}^i = C_{x,d}^i \cup \{k\}$
End if
End for
End While
Return
//Candidate selection end
In the ETSB_OR algorithm,
NB= Discovery Neighbor
$W_{x,d}^i$ = Set of potential forwarding candidate for source x and destination d belonging to region x.
x= Set of relay node
i= Source node
d= destination node
k= next hop
$C_{x,d}^i$ = Set of actual forwarding candidate for source i and destination d in region x FIG. 8 illustrates a system 800 for transmitting data packets in multihop wireless sensor network 100 comprising a plurality of nodes, in accordance with an embodiment. System 800 includes a database 802 and a processor 804 which is operatively coupled with database 802. Database 802 and processor 804 are located within multihop wireless sensor network 100 (not shown in FIG. 8). Processor 804 may be implemented as part of a node within multihop wireless sensor network 100 or may be implemented as a separate computing system which is operatively coupled with each node of multihop wireless sensor network 100. Processor 804 includes an energy computation module 806, a secure value computation module 808, a candidate node selection module 810, and a priority generation module 812. Each module in processor 804 is operatively coupled with other modules as shown in FIG. 8.

A data packet may be transferred from a source node to a destination node within multihop wireless sensor network 100 using one or more hops. In order to facilitate the transfer of data from the source node to the destination node, one or more nodes need to be identified in multihop wireless sensor network 100 through which the data packet needs to be transferred as part of the one or more hops. Database 802 is used to store information associated with multihop wireless sensor network 100 as well as information associated with transfer of the data packet. For example, information such as topology of multihop wireless network 100, size of multihop wireless network 100, and number of nodes present in multihop wireless sensor network 100 may be stored in database 802.

Initially, when a request is generated to transfer a data packet from the source node to the destination node, energy computation module 806 present in processor 804 determines a leftover energy associated with each neighboring node of the source node. Energy computation module 806 determines the leftover energy by calculating difference between a total amount of energy consumed by a node ($E_{max}$) to amount of energy consumed by the node to receive all incoming packets plus amount of energy consumed by the node to send all outgoing packets. In an embodiment, energy computation module 806 may utilize a Leftover Energy Eligibility Based selection scheme (LEEB) for determining the leftover energy.

In the LEEB selection scheme, a cluster head which has the highest leftover energy and requires a minimum distance for communication is selected from the plurality of nodes present in multihop wireless sensor network 100 by energy computation module 806. Typically, intra topology communication cost is a function of network properties. In an embodiment, network properties may correspond to topology size, and whether or not variable power levels are permissible for intra-system communication. If the energy level used for network topology communication is fixed for all nodes, then the cost can be proportional to either (a) The requirement to distribute energy among heads, or (b) 1/node degree, if the requirement is to create dense network.

After selecting the cluster head, average of the minimum energy (AME) levels required by all nodes within the network range to reach the cluster head is determined by energy computation module 806 as shown in equation (1). This has already been explained in detail in conjunction with FIG. 2. Thereafter, the leftover energy in every node in the network is determined by energy computation module 806 as shown in equation (2). This has already been explained in detail in conjunction with FIG. 2.

After energy computation module 806 determines the leftover energy associated with each neighboring node of the source node, secure value computation module 808 determines a secure value for each neighboring node of the source node. The secure value represents the reliability of a node for receiving and forwarding a data packet. Further, the secure value also represents the eligibility and trust factor of a node. Thus, a node with high secure value would indicate that the node would reliably receive the data packet and forward the data packet to the next hop. The secure value is calculated by secure value computation module 808 based on a forward delivery ratio, and a reverse delivery ratio. The forward delivery ratio corresponds to a probability that a data packet successfully arrives at a receiving node from a sending node, and the reverse delivery ratio corresponds to a probability that an Acknowledgment (ACK) packet is successfully received at the sending node. This has already been explained in conjunction with equation (3).

In an embodiment, secure value computation module 808 may periodically update the secure value for each neighboring node of the source node. The secure value may be updated in response to one or more conditions getting fulfilled. Examples of such one or more conditions include, but are not limited to modification in topology of multihop wireless sensor network 100, predetermined cycle time, addition or removal of a neighboring node of the source node, presence or determination of a malicious activity, completion of a hop of a data packet, and changes in software associated with multihop wireless sensor network 100. Similarly, in another embodiment, secure value computation module 808 may update the secure value for each neighboring node of the source node whenever topology of multihop wireless sensor network 100 changes or is modified. The topology may be modified because of various reasons such as addition or removal of nodes within multihop wireless sensor network 100, and isolation of specific nodes from multihop wireless sensor network 100 due to malicious activities.

After determining the leftover energy and the secure value associated with each neighboring node of the source node, energy computation module 806 and secure value computation module 808 transfer the leftover energy information and the secure value information to candidate node selection module 810. Based on the information received, candidate node selection module 810 generates a potential candidate set. The potential candidate set includes one or more nodes of the neighboring nodes associated with the source node. The potential candidate set is generated by candidate node selection module 810 by first selecting nodes with a high leftover energy and a high secure value. In order to identify the nodes with high leftover energy and high secure value, candidate node selection module 810 sorts the nodes from a high value to low value. Thereafter, candidate node selection module 810 selects only those nodes, for which leftover energy is greater than an energy threshold to generate the potential candidate set.

Further, candidate node selection module 810 generates an actual candidate set based on a secure value. The secure value is determined as a factor of those nodes whose leftover energy is greater than the energy threshold. The actual candidate set includes one or more nodes from the potential candidate set whose secure value is greater than a secure value threshold. If it is determined that a node has secure value lower than the secure value threshold, then the node is discarded and not included in the actual candidate set by candidate node selection module 810.

Thereafter, information associated with the actual candidate set is transferred to priority generation module 812. The actual candidate set is sorted by priority generation module

812 based on a priority value. The priority value for each node in the actual candidate set is determined by priority generation module 812 based on the corresponding secure value associated with each node. The secure value is determined based on the ETC matrix as explained in equation (3). Thus, priority generation module 812 sorts the nodes in the actual candidate set based on descending order of the secure value. After sorting the actual candidate set based on the priority value, priority generation module 812 selects a node with the highest priority value in the actual candidate set as the node for receiving the data packer from the source node. Priority generation module 812 adds the address of the node with the highest priority value to the data packet in order to facilitate the transfer of the data packet from the source node to the node with the highest priority value. An example of forwarding a data packet from the source node to the destination node, wherein the data packet is forwarded through node with the highest priority value is further explained in detail in conjunction with FIG. 9.

Figure 9:
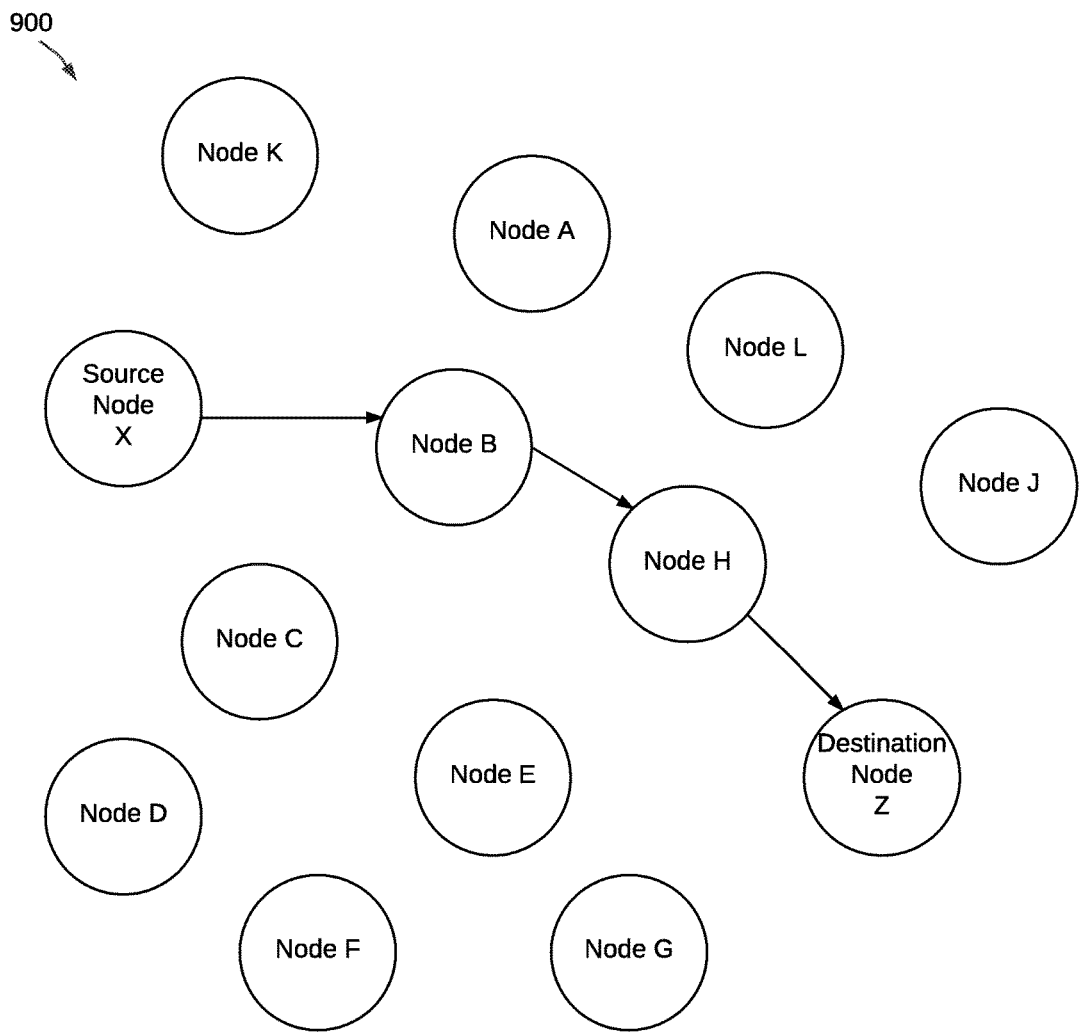
FIG. 9 illustrates a multihop wireless sensor network for forwarding a data packet from a source node to a destination node, in accordance with an embodiment.

FIG. 9 illustrates a multihop wireless sensor network 900 for forwarding a data packet from a source node to a destination node, in accordance with an embodiment. As shown in FIG. 9, source node X wants to transmit a data packet to a destination node Z in multihop wireless sensor network 900. Source node X can use multiple paths to forward the data packet to destination node Z. Source node X determines the leftover energy and secure value of neighboring nodes (A, B, C, D). The leftover energy and the secure value may be determined using an energy computation module and a secure value computation module. The energy computation module and the secure value computation module may be embedded in source node X or may be implemented in a processor that is operatively coupled to source node X. Thereafter, the potential candidate set is determined from the neighboring nodes based on the leftover energy, such that, leftover energy of nodes selected to be included in the potential candidate set is greater than the energy threshold. For example, leftover energy of each of nodes B, C, D and K is greater than the energy threshold and thus they are selected to generate the potential candidate set. The potential candidate set may be generated using a candidate node selection module which may be embedded in source node X or may be implemented in the processor operatively coupled to source node X.

After determining the potential candidate set, an actual candidate set is generated based on secure value. Amongst nodes B, C, D, and K, nodes B and D have secure value greater than a secure value threshold, thus, the actual candidate set includes nodes B and D. Finally, a node having a high priority value is selected from the actual candidate set. The priority value may be determined using a priority generation module that may be embedded in source node X or may be implemented in the processor operatively coupled to source node X. The priority value for each node in the actual candidate set is determined based on the corresponding secure value associated with each node Thus, the nodes B and D are arranged in descending order based on their secure value to form a priority list. The priority list is ordered as node B, followed by node D, indicating that node B has a higher priority value and hence given higher priority. Finally, node X forwards the data packet to node B in the next hop, wherein node B has the highest priority value in the actual candidate set.

Similarly, node B determines a potential candidate set from neighboring nodes associated with node B for forwarding the data packet in the next hop. Amongst these neighboring nodes, nodes F, H, I and J, have leftover energy greater than the energy threshold, and are thus selected to be included in the potential candidate set. Thereafter, an actual candidate set is generated from amongst the potential candidate set. The actual candidate set includes nodes for which secure value is greater than the secure value threshold. Amongst nodes F, H, I, and J, each of nodes H, I, and J have secure value greater than the secure value threshold and are thus included in the actual candidate set. The nodes in the actual candidate set are arranged based on priority value and are thus arranged in the following order: H, J and I. Node H has the highest priority value and is thus selected as the node for receiving the data packet from node B and for forwarding the data packet in the next hop to the destination node Z.

Figure 10:
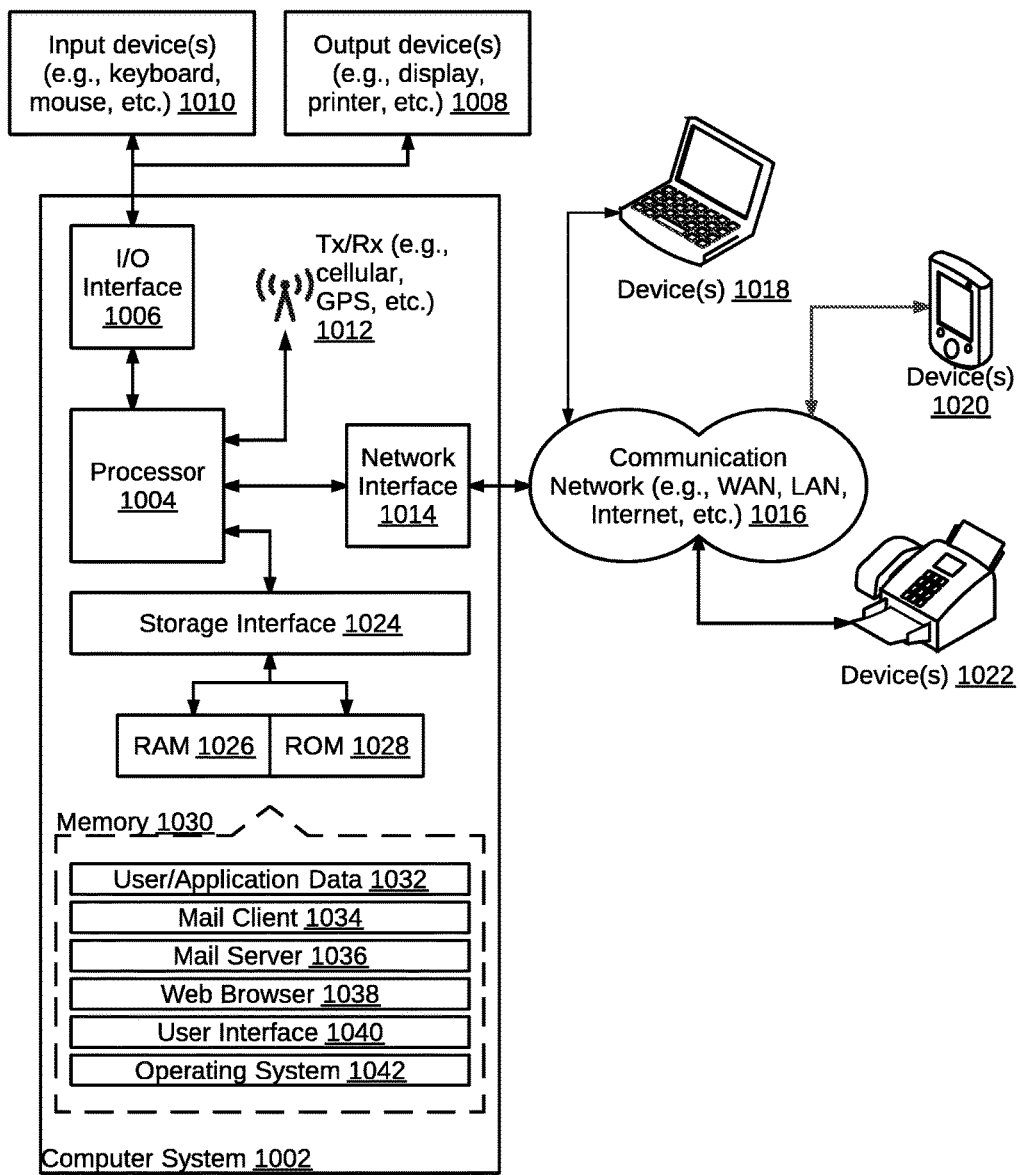
FIG. 10 illustrates a block diagram of an exemplary computer system for implementing various embodiments.

FIG. 10 illustrates a block diagram of an exemplary computer system 1002 for implementing various embodiments is disclosed. Computer system 1002 may comprise a central processing unit ("CPU" or "processor") 1004. Processor 1004 may comprise at least one data processor for executing program components for executing user- or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD Athlon, Duron or Opteron, ARM's application, embedded or secure processors, IBM PowerPC, Intel's Core, Itanium, Xeon, Celeron or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1010 may be a printer, fax machine, video display (e.g., cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (e.g., Texas Instruments WiLink WL1283, Broadcom BCM4760IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (e.g., using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 602 may itself embody one or more of these devices.

In some embodiments, processor 1004 may be disposed in communication with one or more memory devices (e.g., a RAM 1026, a ROM 1028, etc.) via a storage interface 1024. Storage interface 1024 may connect to memory devices 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 1030 may store a collection of program or database components, including, without limitation, an operating system 1032, a user interface application 1034, a web browser 1036, a mail server 1038, a mail client 1040, a user/application data 1042 (e.g., any data variables or data records discussed in this disclosure), etc. Operating system 1032 may facilitate resource management and operation of computer system 1002. Examples of operating system 1032 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1002 may implement web browser 1036 stored program component. Web browser 1036 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 1002 may implement mail server 1038 stored program component. Mail server 1038 may be an Internet mail server such as Microsoft Exchange, or the like. Mail server 1038 may utilize facilities such as ASP, ActiveX, ANSI C++/C#, Microsoft .NET, CGI scripts, Java, JavaScript, PERL, PHP, Python, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement mail client 1040 stored program component. Mail client 1040 may be a mail viewing application, such as Apple Mail, Microsoft Entourage, Microsoft Outlook, Mozilla Thunderbird, etc.

In some embodiments, computer system 1002 may store user/application data 1042, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiment of the invention provide methods, system, and computer program products for node selection in a multihop wireless sensor network comprising a plurality of nodes. The selection of nodes based on the leftover energy and secure value provides energy efficiency and increases reliability of the overall system. The method provides consistency in delivering information as the nodes are selected based on secure value and thereby avoids repeated retransmission of data packets due to loss of data packets. Further, the opportunistic routing provided by the energy efficient algorithm ensures minimum power consumption in multihop wireless sensor network. The method also exploits the location information of nodes and selects node located in an area to make clear path for a data packet to reach the destination. Finally, the method for node selection based on the leftover energy, the secure value, optimal routing prolongs the lifetime of the multihop wireless sensor network.

The specification has described systems and methods for node selection in a multihop wireless sensor network comprising a plurality of nodes. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for node selection in a multihop wireless sensor network comprising a plurality of nodes, the method comprising:
    determining, at a source node, a leftover energy associated with each neighboring node of the source node, wherein the leftover energy is determined by calculating difference between a total amount of energy consumed by a node (Emax) to amount of energy consumed by the node to receive all incoming packets plus amount of energy consumed by the node to send all outgoing packets;
    determining, at the source node, a secure value associated with each neighboring node of the source node;
    generating, at the source node, a potential candidate set comprising at least one node of the neighboring nodes associated with the source node, wherein leftover energy of each of the at least one node is greater than an energy threshold;
    generating, at the source node, an actual candidate set, wherein the actual candidate set comprises nodes from the potential candidate whose secure value is greater than a secure value threshold;
    sorting, at the source node, the actual candidate set based on a priority value, wherein the priority value is determined based on the secure value; and
    selecting, at the source node, a node with the highest priority value in the actual candidate set for transmission of a data packet from the source node.

2. The method of claim 1 further comprising determining:
    topology associated with the multihop wireless sensor network;
    neighboring nodes associated with each node of the plurality of the nodes in the multihop wireless sensor network; and
    a destination node for a data packet that is sent from the source node.

3. The method of claim 1, wherein the secure value is calculated based on a forward delivery ratio, and a reverse delivery ratio, wherein the forward delivery ratio corresponds to a probability that a data packet successfully arrives at a receiving node from a sending node, and the reverse delivery ratio corresponds to a probability that an Acknowledgment (ACK) packet is successfully received at the sending node.

4. The method of claim 1, wherein the secure value associated with each neighboring node of the source node is periodically updated.

5. The method of claim 1, wherein the secure value associated with each node is updated whenever topology of the multihop wireless sensor network is modified.

6. The method of claim 1, wherein selecting the node with the highest priority value for transmission of the data packet further comprises adding address of the node with the highest priority value to the data packet.

7. A system for transmitting data packets in a multihop wireless sensor network comprising a plurality of nodes, the system comprising:
    a memory; and
    a processor, wherein the processor is operatively coupled to the memory, the processor configured to:
    determine a leftover energy associated with each neighboring node of a source node, wherein the leftover energy is determined by calculating difference between a total amount of energy consumed by a node (Emax) to amount of energy consumed by the node to receive all incoming packets plus amount of energy consumed by the node to send all outgoing packets;
    determine a secure value associated with each neighboring node of the source node;
    generate a potential candidate set comprising at least one node of the neighboring nodes associated with the source node, wherein leftover energy of each of the at least one node is greater than an energy threshold;
    generate an actual candidate set, wherein the actual candidate set comprises nodes from the potential candidate whose secure value is greater than a secure threshold;
    sort the actual candidate set based on a priority value, wherein the priority value is determined based on the secure value; and
    select a node with the highest priority value in the actual candidate set for transmission of a data packet from the source node.

8. The system of claim 7, wherein the processor is further configured to determine:
    topology associated with the multihop wireless sensor network;
    neighboring nodes associated with each node of the plurality of the nodes in the multihop wireless sensor network; and
    a destination node for a data packet that is sent from the source node.

9. The system of claim 7, wherein the processor is further configured to calculate the secure value based on a forward delivery ratio, and a reverse delivery ratio, wherein the forward delivery ratio corresponds to a probability that a data packet successfully arrives at a receiving node from a sending node, and the reverse delivery ratio corresponds to a probability that an Acknowledgment (ACK) packet is successfully received at the sending node.

10. The system of claim 7, wherein the processor is further configured to periodically update the secure value associated with each neighboring node of the source node.

11. The system of claim 7, wherein the processor is further configured to update the secure value associated with each node whenever topology of the multihop wireless sensor network is modified.

12. The system of claim 7, wherein the processor is further configured to generate the potential candidate set by selecting nodes with a high leftover energy and a high secure value.

13. The system of claim 7, wherein the processor is further configured to add address of the node with the highest priority value to the data packet for transmission.

14. A computer-usable medium having non-transitory computer readable instructions stored thereon for execution by a processor in a multihop wireless sensor network comprising a plurality of nodes to perform a method for:

determining a leftover energy associated with each neighboring node of a source node, wherein the leftover energy is determined by calculating difference between a total amount of energy consumed by a node (Emax) to amount of energy consumed by the node to receive all incoming packets plus amount of energy consumed by the node to send all outgoing packets;

determining a secure value associated with each neighboring node of the source node;

generating a potential candidate set comprising at least one node of the neighboring nodes associated with the source node, wherein leftover energy of each of the at least one node is greater than an energy threshold;

generating an actual candidate set, wherein the actual candidate set comprises nodes from the potential candidate whose secure value is greater than a secure value threshold;

sorting the actual candidate set based on a priority value, wherein the priority value is determined based on the secure value; and selecting a node with the highest priority value in the actual candidate set for transmission of a data packet from the source node.

* * * * *